United States Patent
Yuan

(10) Patent No.: US 12,254,320 B2
(45) Date of Patent: Mar. 18, 2025

(54) METHOD AND SYSTEM FOR PROCESSING INSTRUCTION TIMEOUT, AND DEVICE AND MEDIUM

(71) Applicant: INSPUR SUZHOU INTELLIGENT TECHNOLOGY CO., LTD., Jiangsu (CN)

(72) Inventor: Zhongke Yuan, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 30 days.

(21) Appl. No.: 18/039,268

(22) PCT Filed: Sep. 29, 2021

(86) PCT No.: PCT/CN2021/121913
§ 371 (c)(1),
(2) Date: May 29, 2023

(87) PCT Pub. No.: WO2022/121470
PCT Pub. Date: Jun. 16, 2022

(65) Prior Publication Data
US 2023/0418616 A1    Dec. 28, 2023

(30) Foreign Application Priority Data
Dec. 7, 2020   (CN) .......................... 202011417281.2

(51) Int. Cl.
*G06F 9/30*    (2018.01)
*G06F 3/06*    (2006.01)
(Continued)

(52) U.S. Cl.
CPC .......... *G06F 9/3861* (2013.01); *G06F 3/0659* (2013.01); *G06F 9/3004* (2013.01);
(Continued)

(58) Field of Classification Search
CPC .... G06F 9/3861; G06F 3/0659; G06F 9/3004; G06F 3/0655; G06F 11/0757; H04L 43/16
See application file for complete search history.

(56) References Cited

U.S. PATENT DOCUMENTS 5,961,622 A  * 10/1999 Hudson ................. G06F 11/141
                                                   713/502
7,219,268 B2 * 5/2007 Adkisson ............ G06F 11/0724
                                                   713/502
(Continued)

FOREIGN PATENT DOCUMENTS

CN   106372019 A   2/2017
CN   109376029 A   2/2019
(Continued)

*Primary Examiner* — Corey S Faherty
(74) *Attorney, Agent, or Firm* — IPro, PLLC

(57) ABSTRACT

Disclosed are a method and system for processing an instruction timeout, a device and a storage medium. The method includes: in response to a timeout of an original instruction sent by a host end reaching a first threshold value, sending an abort instruction, and detecting whether the abort instruction times out; in response to the abort instruction timing out and the timeout of the original instruction reaching a second threshold value, sending a reset instruction to reset a target end; in response to the reset instruction timing out and the timeout of the original instruction reaching a maximum threshold value, removing the target end, and determining whether the original instruction is blocked at the target end; and in response to the original instruction not being blocked at the target end, returning an instruction error prompt to the host end.

14 Claims, 1 Drawing Sheet

(51) Int. Cl.
*G06F 9/38* (2018.01)
*G06F 11/07* (2006.01)
*H04L 43/16* (2022.01)

(52) U.S. Cl.
CPC ........ *G06F 3/0655* (2013.01); *G06F 11/0757* (2013.01); *H04L 43/16* (2013.01)

(56) References Cited

U.S. PATENT DOCUMENTS

| | | | |
|---|---|---|---|
| 9,423,960 B2* | 8/2016 | Fisher | G06F 12/02 |
| 9,940,128 B2* | 4/2018 | Steinmacher-Burow | G06F 9/30043 |
| 9,996,262 B1* | 6/2018 | Nemawarkar | G06F 3/0673 |
| 10,360,033 B2* | 7/2019 | Greiner | G06F 9/30087 |
| 10,620,832 B1* | 4/2020 | Nemawarkar | G06F 11/3034 |
| 10,708,352 B2* | 7/2020 | Seo | H04L 67/1095 |
| 11,086,740 B2* | 8/2021 | Zou | G06F 11/2094 |
| 2012/0063326 A1* | 3/2012 | Rahman | H04L 41/0622 370/242 |
| 2020/0379760 A1* | 12/2020 | Jacobi | G06F 9/3004 |

FOREIGN PATENT DOCUMENTS

| | | |
|---|---|---|
| CN | 109741153 A | 5/2019 |
| CN | 112631659 A | 4/2021 |

* cited by examiner

METHOD AND SYSTEM FOR PROCESSING INSTRUCTION TIMEOUT, AND DEVICE AND MEDIUM

CROSS-REFERENCE TO RELATED APPLICATION

The present disclosure claims the priority of the Chinese patent application filed on Dec. 7, 2020 before the China National Intellectual Property Administration with the application number of 202011417281.2 and the title of "METHOD AND SYSTEM FOR PROCESSING INSTRUCTION TIMEOUT, DEVICE, AND MEDIUM", which is incorporated herein in its entirety by reference.

FIELD

The present disclosure relates to the field of storage and, more particularly, to a method and a system for processing an instruction timeout, a computer device, and a readable medium.

BACKGROUND

Storage devices often have instruction timeouts when sending non-volatile memory express (NVMe) instructions to disks or heterogeneous storages. Some open-source solutions have some vulnerabilities in processing strategies, which may easily lead to problems of frequent instruction failures, device failures, and unresponsive system blockages.

SUMMARY

In view of this, some embodiments of the present disclosure aim to provide a method and a system for processing an instruction timeout, a computer device and a computer-readable storage medium. On the one hand, an instruction timeout is found timely. Some recoverable failures are recovered by recovery means, to ensure successful execution of an instruction/io. On the other hand, unrecoverable failures and failed devices are found as early as possible, to prevent a more severe blockage problem caused by instruction/io congestion.

Based on the above objective, one aspect of the embodiments of the present disclosure provides a method for processing an instruction timeout. The method includes the following steps: in response to a timeout of an original instruction sent by a host end reaching a first threshold value, sending an abort instruction, and detecting whether the abort instruction times out; in response to the abort instruction timing out and the timeout of the original instruction reaching a second threshold value, sending a reset instruction to reset a target end; in response to the reset instruction timing out and the timeout of the original instruction reaching a maximum threshold value, removing the target end, and determining whether the original instruction is blocked at the target end; and in response to the original instruction not being blocked at the target end, returning an instruction error prompt to the host end.

In some implementations, the method further includes: in response to the timeout of the original instruction reaching a baseline threshold value that is less than the first threshold value, determining whether a target device supports a detecting instruction; and in response to the target device supporting the detecting instruction, sending the detecting instruction to the target device, to detect whether the original instruction is lost.

In some implementations, the method further includes: in response to the original instruction being lost, sending a second reset instruction to recover a target LUN of the target device.

In some implementations, the method further includes: in response to the target device not supporting a detecting instruction, sending a response instruction to the target device to test whether the target LUN is capable of making a response.

In some implementations, sending the reset instruction to reset the target end includes: sending a first sub reset instruction to reset a controller of the target end.

In some implementations, the method further includes: in response to resetting of the controller of the target end being completed, sending, by the host end, the original instruction again.

In some implementations, removing the target end, and determining whether the original instruction is blocked at the target end includes: sending a second sub reset instruction to reset a subsystem of the target end, and revalidating whether the target end is normal; and in response to the target end being abnormal, removing the target end.

Another aspect of the embodiments of the present disclosure further provides a system for processing an instruction timeout. The system includes: an abort module, configured to: in response to a timeout of an original instruction sent by a host end reaching a first threshold value, send an abort instruction, and detect whether the abort instruction times out; a reset module, configured to: in response to the abort instruction timing out and the timeout of the original instruction reaching a second threshold value, send a reset instruction to reset a target end; a removal module, configured to: in response to the reset instruction timing out and the timeout of the original instruction reaching a maximum threshold value, remove the target end, and determine whether the original instruction is blocked at the target end; and a returning module, configured to: in response to the original instruction not being blocked at the target end, return an instruction error prompt to the host end.

Still another aspect of the embodiments of the present disclosure further provides a computer device, including: at least one processor; and a memory. The memory stores computer instructions operable in the processor, and the instructions, when executed by the processor, implement the steps of the above method.

Yet another aspect of the embodiments of the present disclosure further provides a computer-readable storage medium. The computer-readable storage medium stores computer-readable instructions which, when executed by a processor, implements the steps of the above method.

Some embodiments of the present disclosure have the following beneficial technical effects. On the one hand, an instruction timeout is found timely. Some recoverable failures are recovered by recovery means, to ensure successful execution of an instruction/io. On the other hand, unrecoverable failures and failed devices are found as early as possible, to prevent a more severe blockage problem caused by instruction/io congestion.

BRIEF DESCRIPTION OF THE DRAWINGS

In order to describe the embodiments of the present disclosure or the technical solutions in the prior art more clearly, drawings required to be used in the embodiments or the illustration of the prior art will be briefly introduced below. Obviously, the drawings in the illustration below are only some embodiments of the present disclosure. Those ordinarily skilled in the art also may obtain other embodiments according to these drawings without doing creative work.

DETAILED DESCRIPTION

To make the objectives, technical solutions and advantages of the present disclosure clearer, the embodiments of the present disclosure are further described below in detail in combination with embodiments and with reference to accompanying drawings.

It should be noted that all the expressions of "first" and "second" in the embodiments of the present disclosure are used to distinguish two different entities with same names or two different parameters. It may be seen that "first" and "second" are only for the convenience of expression, and should not be understood as limiting the embodiments of the present disclosure. The subsequent embodiments will not explain them one by one.

Figure 1:
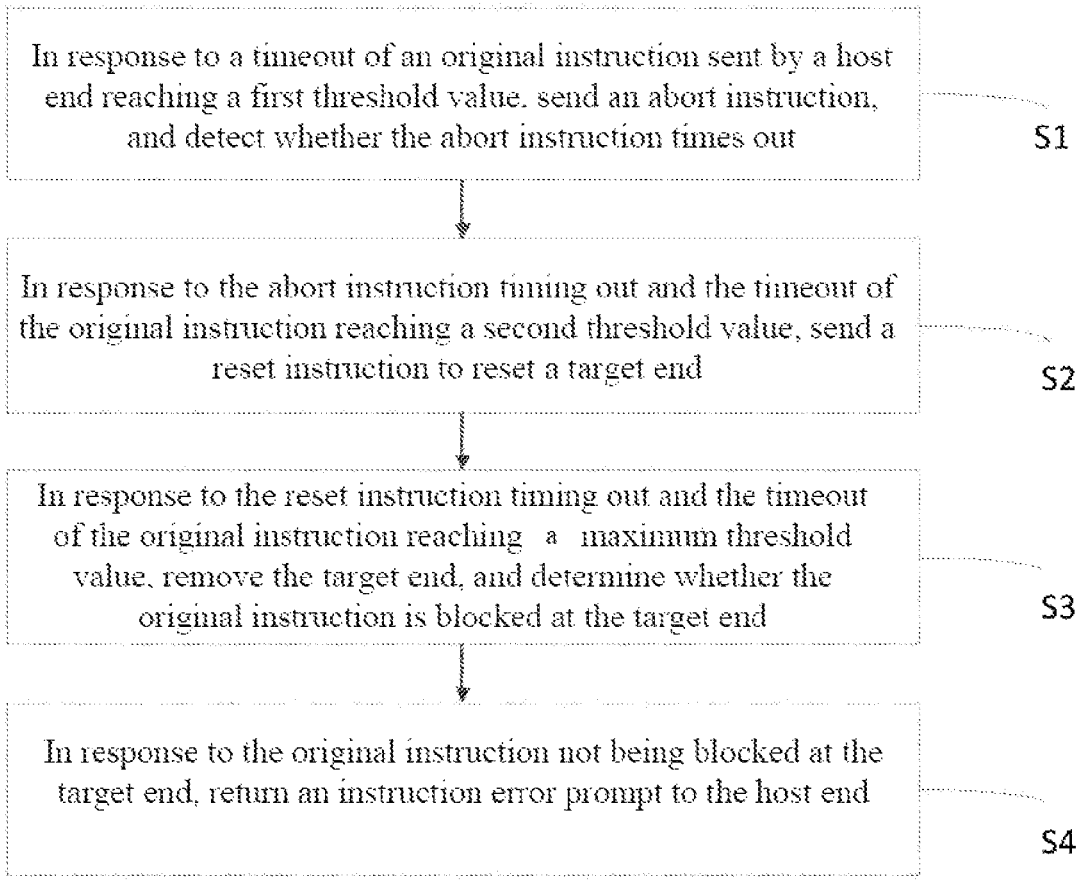
FIG. 1 is a schematic diagram of an embodiment of a method for processing an instruction timeout according to some embodiments of the present disclosure.

Based on the above objective, a first aspect of the embodiments of the present disclosure provides an embodiment of a method for processing an instruction timeout. FIG. 1 is a schematic diagram of an embodiment of a method for processing an instruction timeout according to the present disclosure. As shown in FIG. 1, the present embodiment of the present disclosure includes the following steps:

S1, in response to a timeout of an original instruction sent by a host end reaching a first threshold value, sending an abort instruction, and detecting whether the abort instruction times out;

S2, in response to the abort instruction timing out and the timeout of the original instruction reaching a second threshold value, sending a reset instruction to reset a target end;

S3, in response to the reset instruction timing out and the timeout of the original instruction reaching a maximum threshold value, removing the target end, and determining whether the original instruction is blocked at the target end; and S4, in response to the original instruction not being blocked at the target end, returning an instruction error prompt to the host end.

In some implementations, different timeout threshold values may be set according to different input/output (I/O) instructions and management instructions, including a baseline threshold value, a first threshold value, a second threshold value, and a maximum threshold value. The baseline threshold value, the first threshold value, the second threshold value, and the maximum threshold value increase in sequence.

In some implementations, when the host end sends an instruction to a disk, a system records sending time of the instruction, and then regularly inquires a status and time consumption of the instruction through a timer. According to the current instruction status, it is checked whether the current instruction status exceeds a specific timeout threshold value. If the instruction exceeds a certain time threshold value, a corresponding checking and repairing process is executed. Some embodiments of the present disclosure are illustrated by using a non-volatile memory express (NVMe) instruction and a small computer system interface (SCSI) instruction, but the present disclosure is not limited to this.

In some implementations, the method further includes: in response to the timeout of the original instruction reaching a baseline threshold value that is less than the first threshold value, determining whether a target device supports a detecting instruction; and in response to the target device supporting the detecting instruction, sending the detecting instruction to the target device, to detect whether the original instruction is lost. In some implementations, for the SCSI instruction, when it is found that the original instruction exceeds the baseline threshold value for the first time, an ordered test unit ready (otur instruction) is sent to check the responsiveness of the disk and whether the original instruction is lost. In some implementations, a protocol stipulates that when the target end receives the otur instruction, the target end needs to return the instructions before the otur instruction in sequence before replying the otur instruction. If the original instruction is not received when the otur is returned, it is considered that the original instruction is lost.

In some implementations, the method further includes: in response to the original instruction being lost, sending a second reset instruction to recover a target logical unit (LUN) of the target device. In some embodiments, a LUN reset command is sent to reset the target LUN and recover the target LUN. After the operation is completed, the instruction is completed by means of retrying.

In some implementations, the method further includes: in response to the target device not supporting the detecting instruction, sending a response instruction to the target device to test whether the target LUN is capable of making a response. In some implementations, for the target device that does not support the otur instruction, only a tur instruction is sent to test whether the target LUN may make a response when the timeout reaches the baseline threshold value.

In some implementations, in response to the timeout of the original instruction sent by the host end reaching a first threshold value, an abort instruction is sent, and whether the abort instruction times out is detected. In some implementations, for the NVME instruction, when it is found that the original instruction exceeds the first threshold value for the first time, an NVMe abort instruction is sent to abort the instruction. In some implementations, after the abort instruction is sent, the controller of the target end needs to set the target instruction to an "aborted" state and return the target instruction, and the system will resend the instruction. In some implementations, for the SCSI instruction, if the timeout of the original instruction reaches the first threshold value, an initiator end needs to abort the instruction through the abort instruction at this time. In some implementations, after the abort instruction is sent, the target end needs to set the target instruction to an "aborted" state and return, and the system will resend the instruction.

In some implementations, in response to the abort instruction timing out and the timeout of the original instruction reaching a second threshold value, a reset instruction is sent to reset the target end. In some implementations, if the instruction is not returned in the abort process, which causes triggering the abort instruction to time out, the system needs to reset the target end to recover the error. In some implementations, a target reset is sent to reset a target. A protocol stipulates that the target end needs to return all instructions being processed on a device after receiving a device reset. In some implementations, the system will determine, on the basis of an actual status of a returned io, whether to perform a retry operation.

In some implementations, sending a reset instruction to reset a target end includes: sending a first sub reset instruction to reset a controller of the target end. In some implementations, for the NVMe instruction, if the instruction is not returned in the abort process, which causes triggering abort to time out, the system needs to reset the controller of the target end to recover the error. In some implementations, a controller reset is sent to reset a target controller. A protocol stipulates that the target end needs to return all instructions being processed on the controller after receiving the controller reset, and complete a reset operation performed on the controller.

In some implementations, the method further includes: in response to resetting of the controller of the target end being completed, sending, by the host end, the original instruction again. In some implementations, after the resetting is completed, the host end may resend the original instruction for one time. If the instruction fails or times out again, the failed hard disk is isolated, and otherwise, the instruction is completed.

In some implementations, in response to the reset instruction timing out and the timeout of the original instruction reaching the maximum threshold value, the target end is removed, and whether the original instruction is blocked at the target end is determined. In some implementations, if the instruction is still not processed, the system may check whether the timeout of the original instruction exceeds the maximum threshold value. In some implementations, if the timeout of the original instruction exceeds the maximum threshold value, it is considered that the anomaly on the target end may not be recovered; the instruction is returned with an error; and the target end device is removed (if the target end is a hard disk, a disk kick operation is performed). In some implementations, if the original instruction is blocked at the target end and may not be returned, returning the instruction with an error may not be completed. After reaching the hung io time, the blockage is recovered by resetting an initiator end program.

In some implementations, removing the target end, and determining whether the original instruction is blocked at the target end includes: sending a second sub reset instruction to reset a subsystem of the target end, and revalidating whether the target end is normal; and in response to the target end being abnormal, removing the target end. In some implementations, for the NVMe instruction, when the timeout exceeds the maximum threshold value, the instruction is returned with an error. At the same time, the host end sends a subsystem reset to reset the entire subsystem of the target end. After the resetting succeeds, the host end reads information and status of the target end again to validate whether the target end is normal. If the validation fails, the system considers that the anomaly of the target end may not be recovered, and the target end device is removed (if the target end is a hard disk, a disk kick operation is performed). In some implementations, if the original instruction is blocked at the target end and may not be returned, the returning the instruction with an error may not be completed. After reaching the hung io time, the blockage is recovered by resetting a host end program.

In some implementations, in response to the original instruction not being blocked at the target end, an instruction error prompt is returned to the host end.

In some implementation methods, it is supported for an upper-level application to customize time to live time. After reaching the time to live time, application services are affected, and upper-level services no longer care about the io results. In some implementations, after it is detected that io reaches a ttl timeout time, the abort instruction is used to abort this instruction, and an instruction failure is directly returned to the application after this instruction is returned. In some implementations, if a special management instruction (such as an arbitration instruction) times out, the special management instruction is aborted by using an abort instruction, and instruction retrying is no longer performed, but an instruction failure is directly returned to an upper-level application.

It should be particularly pointed out that the various steps in the various embodiments of the method for processing an instruction timeout may cross, replace, add, or delete each other. Therefore, these reasonable permutations, combinations, and transformations for the method for processing an instruction timeout should also fall within the protection scope of the present disclosure, and the protection scope of the present disclosure should not be limited to the embodiments.

Based on the above objective, a second aspect of the embodiments of the present disclosure provides a system for processing an instruction timeout, including: an abort module, configured to: in response to a timeout of an original instruction sent by a host end reaching a first threshold value, send an abort instruction, and detect whether the abort instruction times out; a reset module, configured to: in response to the abort instruction timing out and the timeout of the original instruction reaching a second threshold value, send a reset instruction to reset a target end; a removal module, configured to: in response to the reset instruction timing out and the timeout of the original instruction reaching a maximum threshold value, remove the target end, and determine whether the original instruction is blocked at the target end; and a returning module, configured to: in response to the original instruction not being blocked at the target end, return an instruction error prompt to the host end.

In some implementations, the system further includes a detection module, configured to: in response to the timeout of the original instruction reaching a baseline threshold value that is less than the first threshold value, determine whether a target device supports a detecting instruction; and in response to the target device supporting the detecting instruction, send the detecting instruction to the target device, to detect whether the original instruction is lost.

In some implementations, the system further includes a second reset module, configured to: in response to the original instruction being lost, send a second reset instruction to recover a target LUN of the target device.

In some implementations, the system further includes a response module, configured to: in response to the target device not supporting the detecting instruction, send a response instruction to the target device to test whether the target LUN is capable of making a response.

In some implementations, the reset module is configured to send a first sub reset instruction to reset a controller of the target end.

In some implementations, the system further includes a sending module, configured to: in response to resetting of the controller of the target end being completed, enable the host end to send the original instruction again.

In some implementations, the removal module is configured to: send a second sub reset instruction to reset a subsystem of the target end, and revalidate whether the target end is normal; and in response to the target end being abnormal, remove the target end.

Based on the above objective, a third aspect of the embodiments of the present disclosure provides a computer device, including: at least one processor; and a memory. The memory stores computer instructions operable in the processor. The instructions are executed by the processor to implement the following steps: S1, in response to a timeout of an original instruction sent by a host end reaching a first threshold value, sending an abort instruction, and detecting whether the abort instruction times out; S2, in response to the abort instruction timing out and the timeout of the original instruction reaching a second threshold value, sending a reset instruction to reset a target end; S3, in response to the reset instruction timing out and the timeout of the original instruction reaching a maximum threshold value, removing the target end, and determining whether the original instruction is blocked at the target end; and S4, in response to the original instruction not being blocked at the target end, returning an instruction error prompt to the host end.

In some implementations, the following steps are further included: in response to the timeout of the original instruction reaching a baseline threshold value that is less than the first threshold value, determining whether a target device supports a detecting instruction; and in response to the target device supporting the detecting instruction, sending the detecting instruction to the target device, to detect whether the original instruction is lost.

In some implementations, the following step is further included: in response to the original instruction being lost, sending a second reset instruction to recover a target LUN of the target device.

In some implementations, the following step is further included: in response to the target device not supporting the detecting instruction, sending a response instruction to the target device to test whether the target LUN is capable of making a response.

In some implementations, sending the reset instruction to reset the target end includes: sending a first sub reset instruction to reset a controller of the target end.

In some implementations, the following step is further included: in response to resetting of the controller of the target end being completed, sending, by the host end, the original instruction again.

In some implementations, removing the target end, and determining whether the original instruction is blocked at the target end includes: sending a second sub reset instruction to reset a subsystem of the target end, and revalidating whether the target end is normal; and in response to the target end being abnormal, removing the target end.

Figure 2:
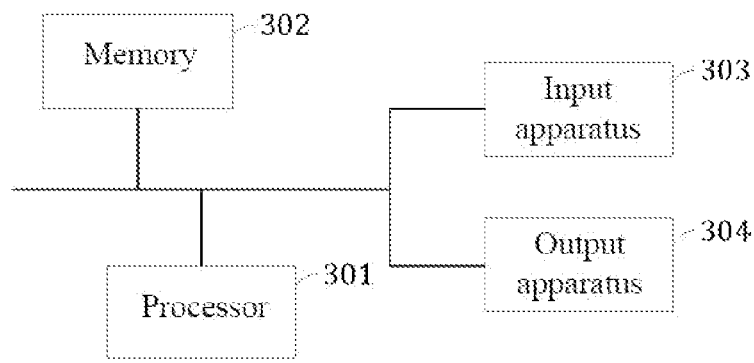
FIG. 2 is a schematic diagram showing a hardware structure of an embodiment of a computer device for processing an instruction timeout according to some embodiments of the present disclosure.

FIG. 2 is a schematic diagram showing a hardware structure of one embodiment of the above computer device for processing an instruction timeout according to the present disclosure.

An apparatus as shown in FIG. 2 is taken as an example. The apparatus includes a processor 301 and a memory 302, and may further include: an input apparatus 303 and an output apparatus 304.

The processor 301, the memory 302, the input apparatus 303, and the output apparatus 304 may be connected by a bus or in other ways. In FIG. 2, bus connection is taken as an example, but the present disclosure is not limited to this.

The memory 302 is used as a non-volatile computer-readable storage medium that may be configured to store non-volatile software programs, non-volatile computer executable programs, and modules, for example, program instructions/modules corresponding to the method for processing an instruction timeout in the embodiments of the present application. The processor 301 perform various functional applications and data processing of a server by running the non-volatile software programs, instructions, and modules stored in the memory 302, thus implementing the method for processing an instruction timeout in the method embodiment.

The memory 302 may include a program storage region and a data storage region. The program storage region may store an operating system and an application program required by at least one function. The data storage region may store data created according to the use of the method for processing an instruction timeout. In addition, the memory 302 may include a high-speed random access memory, and may further include a non-volatile memory, such as at least one magnetic disk storage device, a flash memory device, or other volatile solid-state storage devices. In some embodiments, the memory 302 includes memories remotely disposed with respect to the processor 301, and these remote memories may be connected to a local module through a network. Embodiments of the above network include, but are not limited to, the Internet, an intranet, a local area network, a mobile communication network, and combinations thereof.

The input apparatus 303 may receive an input user name, password, and other information. The output apparatus 304 may include a display screen and other display devices.

The program instructions/modules corresponding to one or more methods for processing an instruction timeout are stored in the memory 302. When executed by processor 301, the program instructions/modules implement the method for processing an instruction timeout in any of the above method embodiments.

Any embodiment of the computer device that executes the above method for processing an instruction timeout may achieve the same or similar effect as or to any corresponding method embodiment.

The present disclosure further provides a computer-readable storage medium, for example, a non-volatile computer-readable storage medium, which stores computer-readable instructions that implement the above method when executed by a processor.

It should be finally noted that those of ordinary skill in the art may understand that implementation of all or a part of the processes in the method of the foregoing embodiment may be completed by the computer-readable instructions that instruct relevant hardware. The programs of the method for processing an instruction timeout may be stored in a computer-readable storage medium. The program may include the processes of the embodiments of the foregoing methods when executed. The storage medium of the programs may be a magnetic disk, an optical disk, a read-only memory (ROM), a random access memory (RAM), or the like. The embodiment of the above computer-readable instructions may achieve the same or similar effects as or to any corresponding method embodiment mentioned above. The steps of a method or algorithm described in conjunction with the embodiments disclosed herein may be directly implemented in hardware, a software module executed by a processor, or a combination of the hardware and the software module. The software module can may be placed in a random access memory (RAM), an internal memory, a read only memory (ROM), an electrically programmable ROM, an electrically erasable programmable ROM, a register, a hard disk, a mobile disk, a CD-ROM, or any storage medium in other forms known to the technical field.

The above are exemplary embodiments of the present disclosure, but it should be noted that various changes and modifications may be made without departing from the scope of disclosure of the embodiments of the present disclosure defined by the claims. The functions, steps, and/or actions of the claims of the method of the disclosed embodiment described herein do not need to be executed in any specific order. In addition, although the elements disclosed in the embodiments of the present disclosure may be described or claimed in an individual form, they may also be understood as plural, unless explicitly limited to singular.

It should be understood that unless the context clearly supports exceptions, the singular form "a" used herein is intended to also include a plural form. It should also be understood that the term "and/or" used herein refers to any and all possible combinations including one or more related listed items.

The sequential numbers of the above-mentioned embodiments of the present disclosure are only for description, and do not represent the advantages or disadvantages of the embodiments.

Those of ordinary skill in the art may understand that all or part of the steps in the foregoing embodiments may be implemented by hardware, or by instructing, by a program, relevant hardware to be completed. The program may be stored in a computer-readable storage medium. The storage medium mentioned above may be a ROM, a magnetic disk, an optical disk, or the like.

Those of ordinary skill in the art should understand that the discussion of any of the above embodiments is only exemplary, and is not intended to imply that the scope of the embodiments of the present disclosure (including the claims) is limited to these embodiments. Under the idea of the embodiments of the present disclosure, the technical features in the above embodiments or different embodiments may also be combined, and there are many other variations of different aspects of the embodiments of the present disclosure as described above, which are not in detail for the sake of brevity. Therefore, any omission, modification, equivalent substitution, improvement, and the like made within the spirit and principle of the embodiments of the present disclosure should be included within the protection scope of the embodiments of the present disclosure.

The invention claimed is:

1. A method for processing an instruction timeout, comprising:
   in response to a timeout of an original instruction sent by a host end reaching a first threshold value, sending an abort instruction, and detecting whether the abort instruction times out;
   in response to the abort instruction timing out and the timeout of the original instruction reaching a second threshold value, sending a reset instruction to reset a target end;
   in response to the reset instruction timing out and the timeout of the original instruction reaching a maximum threshold value, removing the target end, and determining whether the original instruction is blocked at the target end; and
   in response to the original instruction not being blocked at the target end, returning an instruction error prompt to the host end.

2. The method according to claim 1, further comprising:
   in response to the timeout of the original instruction reaching a baseline threshold value that is less than the first threshold value, determining whether a target device supports a detecting instruction; and
   in response to the target device supporting the detecting instruction, sending the detecting instruction to the target device, to detect whether the original instruction is lost.

3. The method according to claim 2, further comprising:
   in response to the original instruction being lost, sending a second reset instruction to recover a target LUN of the target device.

4. The method according to claim 2, further comprising:
   in response to the target device not supporting the detecting instruction, sending a response instruction to the target device to test whether a target LUN is capable of making a response.

5. A computing device, comprising:
   at least one processor; and
   a memory, the memory storing computer instructions operable in the processor, and the instructions, when executed by the processor, implementing the steps of the method according to claim 1.

6. A non-transitory computer-readable storage medium, storing computer-readable instructions, the computer-readable instructions, when executed by a processor, implementing the steps of the method according to claim 1.

7. The method according to claim 2, wherein the baseline threshold value, the first threshold value, the second threshold value, and the maximum threshold value increase in sequence.

8. The method according to claim 2, wherein the method further comprises:
   when the host end sends an instruction to a disk, by using a system, recording sending time of the instruction, and then regularly inquiring a status and time consumption of the instruction through a timer.

9. The method according to claim 8, wherein the method further comprises:
   when it is found that the original instruction exceeds the baseline threshold value for a first time, sending an otur instruction to check responsiveness of the disk and whether the original instruction is lost.

10. The computing device according to claim 5, further comprising:
    in response to the timeout of the original instruction reaching a baseline threshold value that is less than the first threshold value, determining whether a target device supports a detecting instruction; and
    in response to the target device supporting the detecting instruction, sending the detecting instruction to the target device, to detect whether the original instruction is lost.

11. The computing device according to claim 10, further comprising:
    in response to the original instruction being lost, sending a second reset instruction to recover a target LUN of the target device.

12. The computing device according to claim 10, further comprising:
    in response to the target device not supporting the detecting instruction, sending a response instruction to the target device to test whether a target LUN is capable of making a response.

13. The non-transitory computer-readable storage medium according to claim 6, further comprising:
    in response to the timeout of the original instruction reaching a baseline threshold value that is less than the first threshold value, determining whether a target device supports a detecting instruction; and in response to the target device supporting the detecting instruction, sending the detecting instruction to the target device, to detect whether the original instruction is lost.

14. The non-transitory computer-readable storage medium according to claim 13, further comprising:
in response to the original instruction being lost, sending a second reset instruction to recover a target LUN of the target device.

* * * * *